Figure 1:
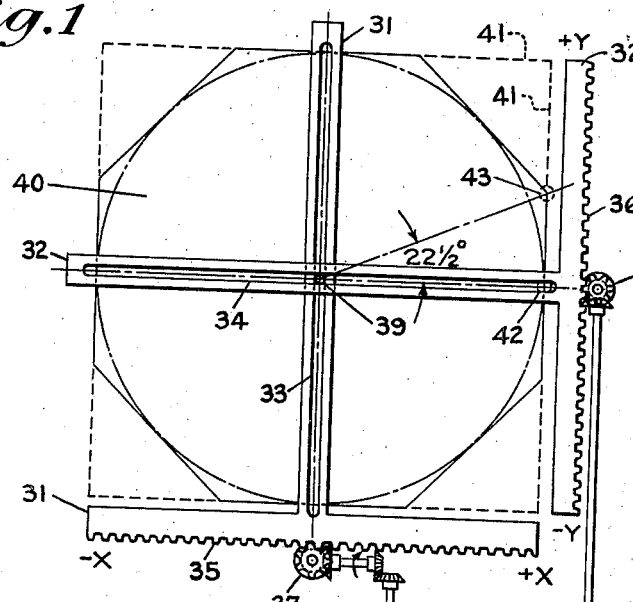
Figure 1:
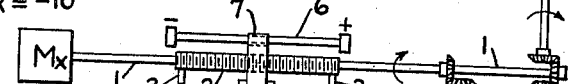
Figure 1:
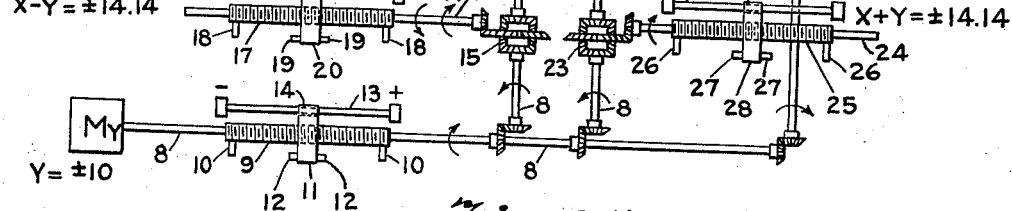

Dec. 31, 1940.　　　　J. D. TEAR　　　　2,227,114
STOP MECHANISM
Filed Feb. 10, 1940

INVENTOR.
James D. Tear
BY
ATTORNEY.

Patented Dec. 31, 1940

2,227,114

UNITED STATES PATENT OFFICE 2,227,114

STOP MECHANISM

James D. Tear, Great Neck, N. Y., assignor to Ford Instrument Company, Inc., Long Island City, N. Y., a corporation of New York Application February 10, 1940, Serial No. 318,233

11 Claims. (Cl. 192—141)

This invention relates to stop mechanisms and particularly to stop mechanisms for two cooperating component slides the movements of which are combined to produce a vector movement.

The principal object of the invention is to provide a stop mechanism such that the boundary of the area covered by the combined reproduced motion of two component slides will approach a circle instead of a square, as would be the case were simple stops only used on each slide.

Other objects will be apparent from the specification and the drawing.

In certain mechanisms in which movements along rectangular coordinates are transmitted to other mechanisms, it is often desirable to limit the movements along the coordinates such that when they are combined the length of the resulting vector does not exceed a predetermined value. This requirement arises whenever the mechanical movement of the mechanism responding to the vector movement must not for mechanical reasons exceed a certain value. For example, in a Plotting apparatus, such as is shown in Patent No. 1,753,781, rectangular components are combined to produce a vector and it is desired that the length of the vector does not exceed a value representing the full travel of the individual component slides. When this condition is met, the combined movements of the component slides are limited to a field approaching a circle whose diameter is equal to the full travel of the individual slides. In the disclosure made herein, which is different from that in Patent No. 1,753,781, the field of travel of the combined movements of the components is an octagon which sufficiently approaches a circle for many uses.

Figure 2:
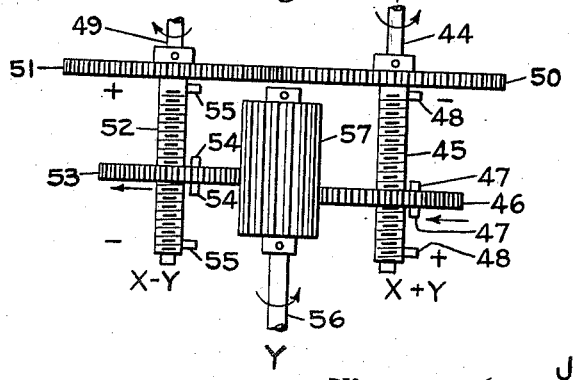

An embodiment of this invention is shown in the accompanying drawing in which:

Fig. 1 is a diagrammatic plan view of an arrangement to combine components into a vector using differentials, and Fig. 2 is an elevational view of a similar arrangement using intermeshing gears.

Referring particularly to Fig. 1, M$x$ and M$y$ represent power units whose motions are in proportion to components of a movement (not shown) resolved along two axes X and Y at right angles to each.

Power unit M$x$ is connected to shaft 1 which has a threaded section 2 and conventional stops 3, 3. Threaded on section 2 of shaft 1, is slide 4 in the form of a nut with conventional stops 5, 5, positioned to cooperate with stops 3, 3. The slide 4 is kept from rotating upon the movement of shaft 1 by rod 6, mounted on some solid part of the apparatus (not shown), and passing through hole 7 of slide 4. Similarly, power unit M$y$ is connected to shaft 8, having a threaded portion 9, on which are mounted stops 10, 10, and slide 11 with its cooperating stops 12, 12. Rod 13 secured to the frame of the apparatus and passing through hole 14 of slide 11 keeps it from rotating upon movement of shaft 8, but permits it to slide laterally.

Shafts 1 and 8 are connected together subtractively by differential 15, the output of which is shaft 16. On shaft 16 is a threaded portion 17, with stops 18, 18, adapted to cooperate with stops 19, 19 on slide 20 which is threaded on the portion 17 of shaft 16. Slide 20 is kept from rotating with shaft 16 by rod 21 secured to the frame of the apparatus and passing through hole 22 of slide 20.

Similarly, shaft 1 and shaft 8 are connected together additively by differential 23, the output of which is shaft 24. On shaft 24 is a threaded portion 25 with stops 26, 26, adapted to cooperate with stops 27, 27 on slide 28 which is threaded on the portion 25 of shaft 24. Slide 28 is kept from rotating with shaft 24 by rod 29, secured to the frame of the apparatus and passing through hole 30 of slide 28.

The stops 3, 3 and 10, 10 are adapted to engage stops 5, 5 and 12, 12 respectively upon the movement of shafts 1 and 8 to the limits of their travel. For purpose of illustration this is taken as ten units in either direction from their mean positions, that is, the limits of the X and Y components are each ±10 units. In the assembly of the apparatus, slides 4 and 11 are located in the middle of threaded portions 2 and 9 of shafts 1 and 8 respectively, when shafts 1 and 8 are in their mean positions.

The stops 18, 18 and 26, 26 are adapted to engage stops 19, 19 and 27, 27 respectively upon the movement of shafts 16 and 24 of 14.14 units of rotation from their mean positions. In the assembly of the apparatus, slides 20 and 28 are located in the middle of threaded portions 17 and 25 of shafts 16 and 24 respectively when shafts 16 and 24 are in their mean positions.

The mechanism for combining the two components, represented by the rotation of the two shafts 1 and 8, into a vector is of the conventional type. It consists of two T-shaped members 31 and 32, each with a slot, 33 and 34, in their respective legs and with racks, 35 and 36, on the outer surface of their respective cross arms. Racks 35 and 36 are adapted to engage gear wheels 37 and 38 connected to shafts 1 and 8 respectively. The legs of the members 31 and 32 are connected together by a pin 39 slidably secured in slots 33 and 34. The members 31 and 32 are restrained to move in the direction of their respective racks by guides (not shown). The legs of the members 31 and 32 and the slots 33 and 34 therein are of such lengths as will permit the rotation of shaft 1 to move member 31 ten units to the right or left from its mean position upon ten units of rotation of shaft 1 in its corresponding direction of rotation, and permit the rotation of shaft 8 to move member 32 ten units up or down from its mean position upon ten units of rotation of shaft 8 in corresponding directions of rotation.

*Operation (Fig. 1)*

Starting with all of the parts of the apparatus shown in Figure 1 in their mean positions, and assuming the direction of the arrows indicates rotations of increasing values, it will be seen that if differentials 15 and 23 were disconnected from shafts 1 and 8, then ten units of movement of shafts 1 and 8 each would move the pin 39 to the upper right-hand corner of the field 40, shown in dotted lines 41. Likewise, pin 39 would be moved into the other corners, similarly shown in dotted lines, upon the reversal of the direction of rotation of shaft 1 or 8 or both. The limit of travel into these areas would be controlled by the stops 3, 3 and 10, 10 only.

With the differentials 15 and 23, and their associated mechanisms, connected to shafts 1 and 8, stops 18 and 19 and stops 26 and 27 come into operative position when the sum of the movements of the components equals the value of 14.14 units, or the difference of the movements of the components equals the value of 14.14 units.

For example: If slide 4 only is moved 10 units to the right, pin 39 will be moved to position 42, when stop 5 engages stop 3 preventing further rotation of shaft 1. In this position the slides 20 and 28 have each moved 10 units to the right and shaft 8 is free to move either in a negative or a positive direction until the combined movement applied to slides 20 or 28 equals the value of 14.14 units when stop 19 engages stop 18 or stop 27 engages stop 26, according to the direction of rotation of shaft 8. This condition is illustrated in the drawing for a positive motion of shaft 8 of 4.14 units when pin 39 will have moved to point 43 and stop 27 will engage stop 26. It will now be seen that in order for the pin 39 to move to a position corresponding to a higher value of the Y component the X component must be correspondingly reduced. In order for the Y component to be increased to 10 units of movement the X component must be reduced to 4.14 units. The ratio of 4.14 units to the original 10 units selected is equal to .414 or the tangent of 22½°. It will thus be seen that the area to which the pin 39 is limited in its travel is an octagon.

Figure 2 discloses a mechanism equivalent in function to the two differentials and the additive and subtractive stop mechanism. The X component is represented by the rotation of shaft 44, which has a threaded portion 45 adapted to move gear 46 vertically when it is kept from rotational movement. Stops 47, 47 are adapted to contact stops 48, 48 upon the movement of gear 46 a distance of 14.14 units from its mean position.

Shaft 44 is connected to shaft 49 by gears 50 and 51 and reproduces in shaft 49 its identical motion, but opposite in direction. On shaft 49 is a threaded portion 52 on which is mounted gear 53 adapted to move therealong upon rotation of shaft 49 and upon its being kept from rotation. Stops 54, 54 on gear 53 are adapted to engage stops 55, 55 upon the vertical movement of gear 53 a distance of 14.14 units from its mean position.

The Y component is represented by the movement of shaft 56 connected to gear 57 which is adapted to mesh with gears 46 and 53 throughout their vertical movements along their respective shafts.

Shaft 44 corresponds to shaft 1 of Fig. 1 and shaft 56 corresponds to shaft 8. In addition to the compound stop just described, the simple stops on the motors M$x$ and M$y$ are required as in Fig. 1.

*Operation (Fig. 2)*

Assuming all parts of the apparatus in their mean positions and that the direction of rotation of the shafts 44 and 56 for increasing values is shown by the direction of the arrows thereon, it will be seen that with shaft 56 stationary and upon rotation of shaft 44 ten units from its mean position in a positive direction, gear 46 is moved down 10 units and gear 53 is moved up 10 units. With the M$x$ unit against its simple stop, as shown in Figure 1, no further movement of shaft 44 in a positive direction is possible.

Upon the movement of shaft 56 in a positive direction, with shaft 44 stationary, gear 57 rotates gear 46 on the threaded portion 45 of shaft 44 and is moved down. It will be noted that gear 46 can be moved down but 4.14 units until stop 47 engages stop 48, when further rotation of shaft 56 is prevented.

Likewise a negative movement of shaft 56 will move gear 53 upward until it has moved 4.14 units, when stop 54 engages stop 55 and prevents further movement of shaft 56.

The operation of the mechanism for negative movements is apparent.

It is of course understood that various changes may be made by those skilled in the art in the details of the embodiment of the invention illustrated in the drawing and described in detail above within the principle and scope of the invention as expressed in the appended claims. For example, the elements, the movements of which it is desired to stop, have been shown as slides receiving their motion in proportion to the rotation of shafts. The elements may be rotating gears or cams receiving their motion in proportion to the linear movements of shafts. Likewise, the field of combined movement of the components has been shown as an octagon, which is similar in general shape to a circle. The field of movement may be made an oval or other figure by predetermining the ratio of the limits of movement of the output of the differentials to the limits of movement of the element that represents a movement of an individual component.

I claim:

1. A stop mechanism for two slides whose movements are generated by the rotation of two individual shafts connected respectively thereto and including stops effective on said slides and said shafts, a plurality of means connected between the said shafts the resultant movements of which means are in proportion respectively to the additive and the subtractive combination of the movements of said shafts, and stops on said means adapted to limit their movement.

2. A stop mechanism for two slides whose movements from their mean positions are generated by the rotation of two individual shafts connected respectively thereto and including stops effective on said slides and said shafts, a plurality of means connected between the said shafts the resultant movements of which are in proportion respectively to the additive and the subtractive movements of said slides from their mean positions, and stops on said means adapted to limit the combined movement of the slides from their mean positions in proportion to the maximum individual movement of the slides from their mean positions in the ratio of 14.14 to 10.

3. A stop mechanism for two slides whose movements from their mean positions are generated by the rotation of two individual shafts connected respectively thereto, stops on said slides, stops on said shafts adapted to become operative with the stops on said slides, a differential connected to said shafts the output of which is the sum of the movements of said shafts, stops associated with the said output, a second differential connected to said shafts the output of which is the difference in movements of said shafts, stops associated with the output of said second differential, the said stops associated with the said outputs being adapted to become operative when the combined movements of said individual outputs have reached definite values.

4. A stop mechanism for two slides whose movements from their mean positions are generated by the rotation of two individual shafts connected respectively thereto, stops on said slides, stops on said shafts adapted to become operative when the stops on said slides reach a position ten units of movement from their mean positions, a differential connected to said shafts the output of which is the sum of the movements of said shafts, stops associated with the said output, a second differential connected to said shafts the output of which is the difference in movements of said shafts, stops associated with the output of said second differential, the said stops associated with the said outputs being adapted to become operative when the combined movements of said individual outputs have reached 14.14 units of movement from their mean positions.

5. A stop mechanism for two slides whose movements are generated by the rotation of two individual shafts connected respectively thereto, stops on said shafts adapted to become operative when the said shafts have rotated ten units from their mean position, a differential connected to said shafts the output of which is the sum of the movements of said shafts, stops associated with the said output, a second differential connected to the said shafts the output of which is the sum of the movements of said shafts but with the motion of one of said shafts applied to the second differential in a direction opposite to the direction of application to the first differential, stops associated with the output of said second differential, the said stops associated with the said outputs being adapted to become operative when the combined movements of said outputs have reached 14.14 units of movement from their mean positions.

6. A stop mechanism for two slides whose movements are generated by the rotation of two individual shafts connected respectively thereto, stops effective on said slides, a threaded portion on one of said shafts, a movable gear threaded on said shaft, a third shaft including a threaded portion, gears connecting the said third shaft to said one of said shafts and adapted to rotate the said third shaft in direct proportion but in a direction opposite to said one of said shafts, a movable gear threaded on said third shaft, an elongated gear secured to the second of said two shafts adapted to mesh with both of the said movable gears, and stops on said movable gears and said one of said shafts and said third shaft adapted to limit the movement of said movable gears.

7. A stop mechanism for two slides whose movements are generated by the rotation of two individual shafts connected respectively thereto, stops effective on said slides adapted to become operative when the said shafts have rotated ten units from their mean positions, a threaded portion on one of said shafts, a movable gear threaded on said threaded portion, a third shaft including a threaded portion, gears connecting said third shaft to said one of said shafts and adapted to rotate said third shaft in proportion and in a direction opposite to the direction of said one of said shafts, a movable gear threaded on said third shaft, an elongated gear secured to the second of said two shafts adapted to mesh with both of the said movable gears, and stops on said movable gears and said one of said shafts and the said third shaft adapted to limit the movement of said movable gears when they have moved 14.14 units from their mean positions.

8. A stop mechanism for two elements whose movements are generated by the movements of two individual shafts connected respectively thereto and including stops effective on said elements and said shafts, a plurality of means connected between the said shafts the resultant movements of which means are in proportion respectively to the additive and the subtractive combination of the movements of said shafts, and stops on said means adapted to limit their movement.

9. A stop mechanism for two elements whose movements from their mean positions are generated by the movements of two individual shafts connected respectively thereto and including stops effective on said elements and said shafts, a plurality of means connected between the said shafts the resultant movements of which are in proportion respectively to the additive and the subtractive movements of said elements from their mean positions, and stops on said means adapted to limit the combined movement of the elements from their mean positions in proportion to the maximum individual movement of the elements from their mean positions in a predetermined ratio.

10. A stop mechanism for two slides whose movements are generated by the rotation of two individual shafts connected respectively thereto, stops on said shafts adapted to become operative when the said shafts have rotated a predetermined number of units from their mean position, a differential connected to said shafts the output of which is the sum of the movements of said shafts, stops associated with the said output, a second differential connected to the said shafts the output of which is the sum of the movements of said shafts but with the motion of one of said shafts applied to the second differential in a direction opposite to the direction of application to the first differential, stops associated with the output of said second differential, the said stops associated with the said outputs being adapted to become operative when the combined movements of said outputs have reached a predetermined number of units of movement from their mean positions.

11. A stop mechanism for two elements whose movements are generated by the rotation of two individual shafts connected respectively thereto, stops effective on said elements adapted to become operative when the said shafts have rotated a predetermined number of units from their mean positions, a threaded portion of one of said shafts, a movable gear threaded on said threaded portion, a third shaft including a threaded portion, gears connecting said third shaft to said one of said shafts and adapted to rotate said third shaft in proportion and in a direction opposite to the direction of said one of said shafts, a movable gear threaded on said third shaft, an elongated gear secured to the second of said two shafts adapted to mesh with both of the said movable gears, and stops on said movable gears and said one of said shafts and the said third shaft adapted to limit the movement of said movable gears when they have moved a predetermined number of units from their mean positions.

JAMES D. TEAR.